Dec. 6, 1927.  
J. P. KEENE  
1,651,604
TANK HEAD CONSTRUCTION
Filed June 5, 1926
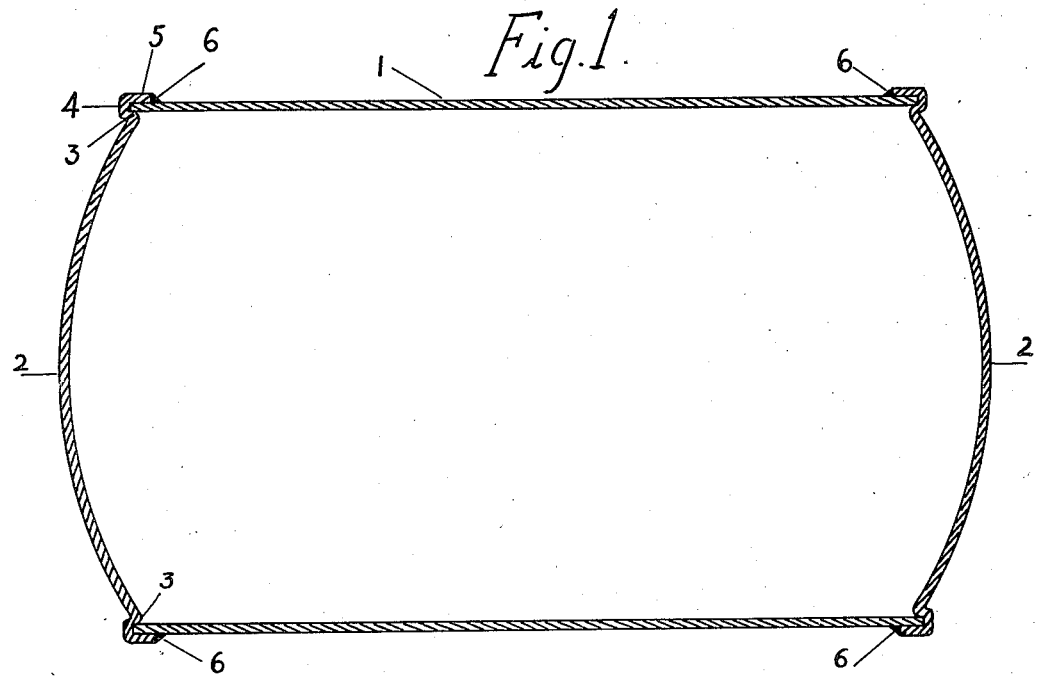
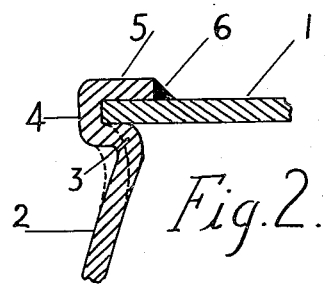
Inventor,
James Philip Keene,
By Arthur H. Ewald,
Attorney.

Patented Dec. 6, 1927.

1,651,604

UNITED STATES PATENT OFFICE.

JAMES PHILIP KEENE, OF YOUNGSTOWN, OHIO.

TANK-HEAD CONSTRUCTION.

Application filed June 5, 1926. Serial No. 113,997.

My invention relates to tank head constructions and has particular reference to the provision of welded heads for a tank adapted to the holding of contents under pressure.

It is well-known fact that while a welded construction possesses very high tensile strength, its ability to resist bending stresses is comparatively low and tank heads of welded construction have therefore been of very uncertain, unsatisfactory and generally unreliable performance. This condition has been due largely to the weakness of welded joints when subjected to bending stresses, as above stated, but has also arisen from the fact that where the weld has been of such a nature as to be subjected only to tensile stresses, the critical limit of tension either of the weld or tank or tank head is reached without warning, thus resulting in an explosion of more or less serious consequences.

The principal object of the present invention is to provide a welded tank head construction in which the difficulties above mentioned are overcome, and a tank head of extremely rigid and durable construction is provided.

A further object of the invention is to provide a tank head construction in which there is an extremely rigid and re-enforced rim by means of which the tank may be handled with the usual hooks and tackle employed for such purpose.

Further objects of the invention will appear from the following detailed description thereof.

In the drawings:

Figure 1 is a sectional view of a tank provided with heads constructed in accordance with this invention.

Figure 2 is an enlarged detail of the tank head construction.

The numeral 1 indicates a tank which may be of cylindrical or other suitable construction. The head 2 of the tank which may be of concavo-convex construction as shown in the drawings, is provided with a channel within which the rim of the tank rests, said channel being formed by an outwardly turned inner flange 3, a base section 4, and an outer flange 5. The inner flange 3 fits against the inner edge of the tank rim, and the outer flange fits against the outside of the tank rim as clearly shown in the drawings. The outer flange 5 is secured to the outside of the tank wall by means of a weld 6.

When a tank provided with heads and constructed as above described is subjected to internal pressure, it will be observed that the incidence of strain on the weld is entirely tensile, and that no bending strains are placed upon the joint. The joint is therefore of extreme strength and rigidity, and the tank is enabled to carry a pressure load equal to the tensile strength of the material of which it and the heads are made, it being commonly observed that when subjected to tensile stresses a weld is of equal or greater strength than the parent or adjacent material. Furthermore, by reason of the provision of the inner flange 3, before the critical limit of tension of the head or tank material is reached, there will be a bulge in the head by reason of the displacement of said inner flange approximately as shown in broken lines in Figure 2, thus giving warning of an impending fracture, and enabling the attendant to take the necessary precautions for obviating the danger.

It will also be seen that in my construction the tank rim is rigidly re-enforced by the inner and outer flanges, as well as by the base section 4 between the flanges, thus adding greatly to the strength of the tank and tank head construction. The ring extension provided by the flange construction described also provides, as will be seen, an ideal means for the handling of the tank by means of the usual hooks and tackle employed for said purpose, and such handling, by reason of the re-enforcement provided by the flanges, may be done without danger of injury either to the tank head or walls.

Having thus fully described my invention, what I claim as new and desire to secure by Letters Patent is:

A welded tank head construction, comprising in combination with a tank, a head for said tank, said head having inner and outer flanges formed integrally therewith and forming a channel to receive the rim of said tank, the fold between the inner flange and head being of substantially uniform section and flexibility therewith, and a weld securing the free edge of said outer flange to the outside wall of said tank.

JAMES PHILIP KEENE.